March 3, 1953  A. W. HUNZ  2,630,297
LIFTING JACK
Filed May 4, 1946  2 SHEETS—SHEET 1
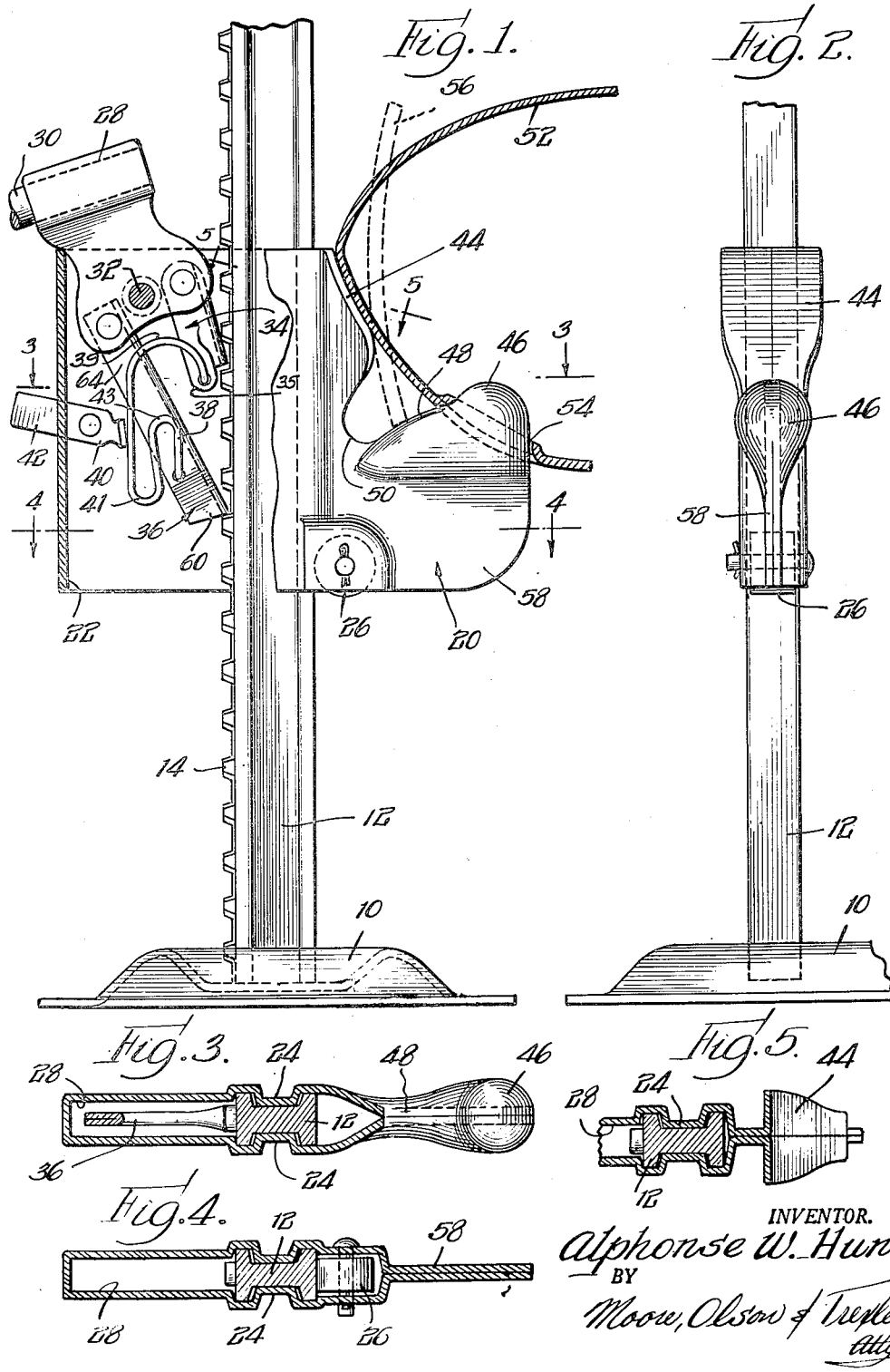
INVENTOR.
Alphonse W. Hunz
BY
Moore, Olson & Trexler
Attys March 3, 1953 A. W. HUNZ 2,630,297
LIFTING JACK
Filed May 4, 1946 2 SHEETS—SHEET 2
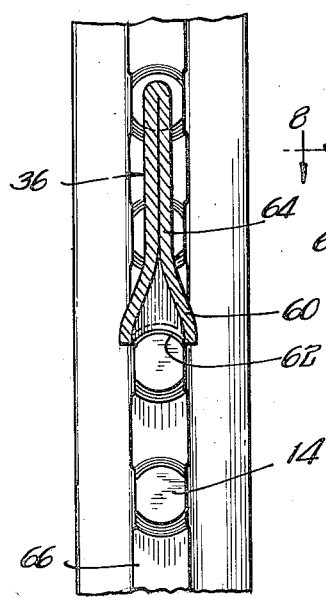
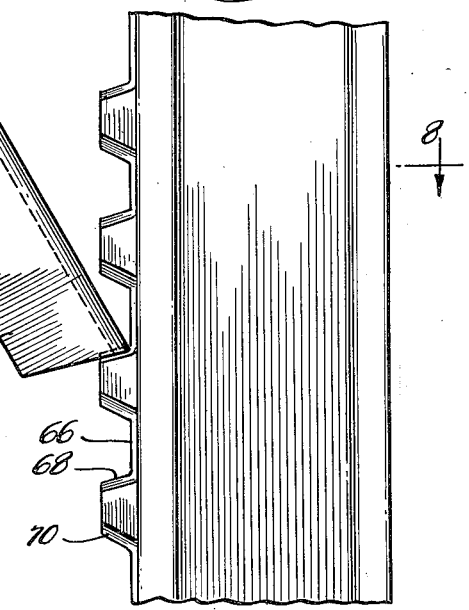
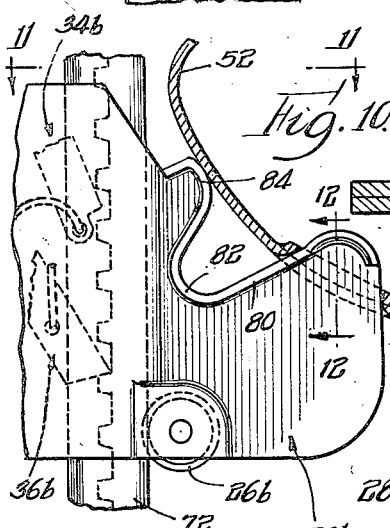
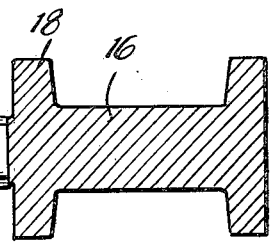
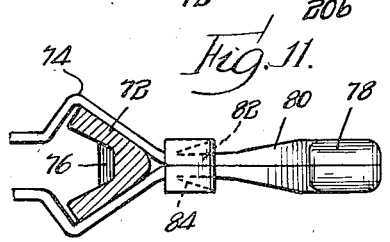
INVENTOR.
Alphonse W. Hunz
BY
Moore, Olson & Trexler
attys.

Patented Mar. 3, 1953

2,630,297

UNITED STATES PATENT OFFICE 2,630,297

LIFTING JACK

Alphonse W. Hunz, East Chicago, Ind.

Application May 4, 1946, Serial No. 667,268

6 Claims. (Cl. 254—109)

The present invention relates to a jack particularly adapted for use with automobiles which employs an elongated toothed bar or rod rolled from metal in such a manner as to be economically made and yet relatively light in cross section and weight with adequate strngth.

The subject matter of the present invention is directed to an automobile jack of the bumper type adapted to lift an automobile by engagement with the bumper. Heretofore bumper jacks have been employed but in general they have avoided using racks or toothed bars because of the difficulty of manufacturing such racks or bars economically. Consequently, certain bumper lifting jacks have been devised utilizing a smooth rod which is gripped by a plurality of shiftable collars or members. Certain other bumper jacks employ hydraulic means. The smooth rod type has the disadvantage of difficult operation whenever the rod becomes roughened either due to rust or due to the impact of other tools in the tool compartment of the automobile. The hydraulic type has the disadvantage of additional cost of manufacturing and the possibility of loss of fluid or the inclusion of air in the fluid and piston chambers. Therefore, it will be readily appreciated that it would be desirable to provide economically a reliable, simple mechanical jack which will avoid the disadvantages inherent in bumper jacks as now commonly employed.

It therefore is an object of the present invention to provide an improved automobile jack of the bumper type which is simple in operation and economical to manufacture.

It is another object of the present invention to provide in an automobile jack an improved bumper engaging hook portion.

Still another object of the present invention is to provide in an automobile jack an improved lifting mechanism having simple parts of stamped metal having configurations complementary to the shape of the sides of the teeth of the toothed bar.

Still another object of the present invention is to provide an improved automobile bumper jack employing a toothed bar of the rolled type and an improved movable lifting member and mechanism.

Other and further objects of the present invention will become apparent by reference to the following description taken in conjunction with the accompanying drawings wherein Figure 1 is a side view of the invention with portions partially broken away to show certain details thereof;

Figure 2 is an end view of the mechanism shown in Figure 1;

Figure 3 is a cross sectional view as seen in the direction of the arrows along the line 3—3 of Figure 1;

Figure 4 is a cross sectional view as seen in the direction of the arrows along the line 4—4 of Figure 1;

Figure 5 is a detailed cross section as seen in the direction of the arrows along the line 5—5 of Figure 1;

Figure 6 is an enlarged rear end detail view of the upright rack bar of the jack;

Figure 7 is an enlarged side detail view of the rack bar;

Figure 8 is an enlarged cross sectional view as seen in the direction of the arrows along the line 8—8 of Figure 7;

Figure 9 is an enlarged detail cross sectional view of a modification, the view generally corresponding to the view shown in Figure 4;

Figure 10 is a partial side view of another form of the invention;

Figure 11 is a top view as seen in the direction of the arrows along the line 11—11 of Figure 10; and Figure 12 is a cross sectional view across a portion of the device shown in Figure 11 as seen in the direction of the arrows along the line 12—12.

Referring to the drawings, and in particular to Figures 1 and 2 thereof, it will be seen that the invention consists of an automobile jack having a base 10 which preferably is of stamped metal which supports an upright toothed bar 12 having a plurality of teeth 14 arranged at spaced intervals which are greater than the dimensions of the base of the teeth in a direction transversely of the bar. The toothed bar 12 is preferably formed of high carbon steel which has been hot rolled to the required shape to produce a toothed bar which is relatively light and small in cross section so that the weight of the bar is maintained at a minimum value while the strength and ruggedness are not sacrificed. The bar may be any suitable beam-like cross sectional configuration such as that shown in Figures 3, 4, 5 and 8. This cross sectional configuration is preferably one having a body or web portion 16 and one or more flange portions 18. One convenient form would be what is commonly known as the I-beam, whereas still another form, such as that illustrated in Figure 9, may be employed. The details of the construction of this bar will further be described and illustrated by reference to Figures 6, 7 and 8.

Mounted upon the toothed bar 12 is a lifting member 20 which has a casing 22 surrounding the bar 12 and having indented or stamped recess portions 24 to guide the casing along the bar 12. Adjacent the bottom edge the casing 22 supports a roller member 26 which engages one flange of the toothed rod 12. The roller serves to relieve undue friction at the bottom of the housing 22 caused by weight of the load being suspended beyond the center of the jack post or bar 12.

The housing 22 has a chamber 28 which contains an actuating mechanism comprising a pivoted actuating member 28 which is provided with a suitable aperture or recess for receiving an actuating handle 30. The member 28 is pivotally supported on stud 32 so that the upper portion of the member 28 projects to the exterior of the casing 20. The actuating member 28 is pivotally connected to a plurality of pawls 34 and 36, the latter pawl being of greater length. The two pawls at intermediate points are interconnected by a spring 38 which is adapted to be engaged by a pivoted member 40. The pivoted member 40 has a portion extending to the exterior of the housing 20 so as to provide a finger portion 42 which may be actuated to cause the inner extremity of the pivoted member 40 to press against the spring 38. Pressure of the member 40 against the spring 38 changes the action of the pawls 34 and 36 so that actuation of the handle 30 produces a lowering action instead of a lifting action.

Particular attention is directed to the construction and location of the spring 38 relative to the pawls 34 and 36. It will be noted that the pawl 34 has a portion which projects beyond the tooth engaging surface so as to provide an ear 35 for receiving one extremity of the spring 38. The spring 38 has a plurality of curved portions 39, 41 and 43 each of which is at least a semi-circle. By providing at least a semi-circle curve an improved action is obtained and breakage of the spring is avoided. The larger radius 39 of the spring absorbs the up and down movement of the pawls without moving appreciably the body of the spring. The large curved portion 39 immediately adjacent the point where the spring engages the ear 35 imparts a livelier action of the short pawl into engagement with the teeth of the bar 12 when the casing 20 is being moved upwardly to raise or lift a load. The provision of at least a semi-circle curvature at each change of direction of the spring permits the back or body of the spring to extend in a substantially vertical direction for engagement by the pivoted member 40. The vertical location of the body of the spring relative to the pivoted member 40 reduces to a minimum the movement of the spring relative to the pawl 40 thereby avoiding wear which in other constructions might result in weakening of the spring and consequent breakage thereof.

On the other side of the toothed rod or post 12 the housing 20 is provided with bumper engaging surfaces. One of the bumper engaging surfaces comprises a flat surface 44 which is arranged at an acute angle to the vertical and extends partway down from the top of the housing 20. The housing also carries a projecting bulbous portion 46 which as may be seen from Figure 1 is adapted to engage a suitable aperture 54 in the more recent type of bumpers 52. The bulbous hook-like portion 46 has a relatively flat rearwardly inclined surface 48 which is at an acute angle to the horizontal. The bumper engaging surfaces 44 and 48 are separated by a concave recess 50. The solid line configuration 52 denotes the cross section of the most recent models of bumper bars which are provided with an aperture such as the aperture 54 into which the bulbous hook portion 46 fits. When the older style bumper is engaged, the location of such bumper is illustrated by the dotted line configuration 56. The older type bumper 56 has its lower edge in engagement with the inclined surface 48 and its generally vertical surface in engagement with the lower portion of the vertically inclined surface 44. In order that the surface 44 may not mar the plated finish of the bumper, this surface may be provided with a suitable covering member of fiber, plastic or rubber.

From an examination of Figures 3, 4 and 5, it will be seen that preferably the housing 20 is formed of a single sheet of stamped steel which has been folded so as to form the chamber 28. The folded edges in the proximity of the bulbous hook portion 46 are smoothed by suitable forming and grinding so as to provide an even, smooth, flat surface and hence the outer limits of such material are indicated by dotted lines in Figures 2 and 3. Immediately beneath the bulbous portion 46, the two folded portions of the housing 20 are closely adjacent to each other as at 58. Of course it will be understood that if desired these portions 58 may be secured together by any suitable fastening means including electric or spot welding.

The vertically inclined surfaces 44 are formed by bending outwardly certain metal portions corresponding to tabs or ear portions. These are bent outwardly at right angles to each other to form a vertically inclined surface 44 as is readily apparent from Figures 1, 2, 3 and 5.

From Figures 3, 6, 7 and 8, it will be seen that the pawls 34 and 36 are preferably also formed of stamped steel members which are in the form of folded over sheets having their outer extremities flared to form portions 60 which have curved outer edges 62 which are complementary to the curved side surfaces of the teeth 14. Just above the flared portions 60 the pawls have rigid portions formed by the folded metal portions 64. These folded metal portions 64 extend up into the pivotally supported actuating members 28 which also may be formed of a stamped metal member folded over to provide the socket or recess for the actuating handle 30. From this it will be seen that the raising and lowering housing 20 is susceptible of economical manufacture from stamped metal components.

The toothed bar 12 shown in detail in Figures 6, 7 and 8 is preferably formed by hot rolling a high carbon steel bar between two rollers. After the bar has been formed into a generally beam shaped bar such as the I-beam cross sectional configuration illustrated, the bar is then rolled between a set of rollers. The roller which engages the outer surface of the flange 18 is provided with a plurality of generally circular recesses into which the metal of the bar flows to form the longitudinally spaced teeth. The teeth have a transverse dimension substantially equal to or less than the transverse dimension of the web portion 16. It is to be noted that the teeth have a transverse dimension which is less than the base dimension of the teeth in a direction longitudinally of the bar 12. This dimensional relation provides for the successful rolling or hot forming of toothed I-beam sections. Such sections of great strength may be formed of high carbon steel. The narrow teeth permit the use of narrow pawls and hence the walls of the housing 20 may be indented so as to surround a greater portion of the relatively narrow bar or beam 12. Thus the housing may be formed so as to provide a much more rigid support when lifting the rod. In forming the teeth, ridge portions 66 are formed in the interstices. These ridge portions 66 facilitate the rolling operation and provide a stronger toothed bar than would be the case if an attempt were made to roll the metal between the teeth flush with the surface of the flange. Due to the rolling operation, the upper surface 68 of each tooth is at a steeper angle than the bottom surface 70. By providing such shaped tooth it is possible to roll the teeth and have the tooth roller leave the surface of the flange 18 without distortion of the teeth and without introducing inaccuracies in the spacing of the teeth. The teeth thus formed have convex or radially shaped side surfaces which are engaged by the pawls 34 and 36, each of these pawls having tooth engaging surfaces 62 which are complementary thereto.

While in Figures 1 to 8 it has been convenient to show the toothed bar 12 as having an I-beam cross-sectional configuration, other cross sectional configurations also may be employed such as that illustrated in Figure 9 where the bar is surrounded by the jack housing 20a and is provided with a mechanism chamber 28a. The housing has a portion 25 which partly surrounds the flange of the bar so as to guide the housing 20a in its upward and downward movements. A bar illustrated has a web or beam portion 16a and a single flange 18a. The flange 18a is provided with teeth 14a of a configuration similar to that shown in the previous figures.

From the foregoing it will be seen that in the course of the present invention there has been provided an improved projecting portion above the main bearing of the lift and a receding portion which is below the projecting portion.

The projecting bulbous portion 46 is sloped downward toward the jack bar 12 so as to produce a tendency in lifting to slide the bumper bar into the recess 50 so as to be gripped securely and to shift the weight of the load nearer to the jack bar or post 12. The housing 20 has a bumper engaging portion with its body-like opening which gives two-point bearing to the different shaped bumpers as is apparent from Figure 1. Whether the bumper is of the more recent configuration or of the older configuration, two-point contact and suspension is given in each instance.

It has been mentioned that the teeth 14 are spaced apart at distances greater than the base dimension of the teeth. Preferably the spacing between the teeth should be of the order substantially more than 2½ times the height of the teeth. The height of the teeth as employed in one embodiment has been preferably not more than ⅜ of an inch. Such spacing of the teeth as compared to the size and mass of the individual teeth not only facilitates the hot rolling operation, but avoids the possibility of tremendous heat producing fire cracking of the roll. The greater spacing also makes it possible to form the inter-dental recesses or spaces substantially flat in a plane extending parallel to the top surface of the flange of the bar. Such tooth arrangement furthermore provides a self-cleaning arrangement which does not readily retain dirt or other foreign matter. Any accumulation of foreign matter will automatically be cleaned by the pawls which operate in a manner so as to effectively clean or scrape the inter-dental surface. The construction illustrated provides a bumper jack of relatively simple construction employing reliable, tested mechanical principles not subject to inoperativeness due to small amounts of rust, corrosion or foreign matter. The toothed bar may be made with sufficient uniformity between the teeth as to compare favorably with teeth formed by more expensive means or processes. Hence, a reliably operated automobile jack is made possible.

Reference may now be had to Figures 10, 11 and 12 which illustrate further embodiments of the present invention. Since Figure 10 corresponds in part to Figure 12, certain elements have been given corresponding reference characters carrying the suffix letter b. Thus there is shown a housing 20b having a roller 26b which engages an upright rod 72 having a configuration which differs from the upright rod or beam 12 of Figure 1. The housing 20b contains a lifting mechanism including the pawls 34b and 36b together with other associated elements such as those shown in Figure 1.

The housing 20b of Figures 10, 11 and 12 has a portion 74 which surrounds a substantial part of the upright toothed bar 72 which as may be seen from Figure 11 has a generally V-shaped cross sectional configuration with round teeth 76 on the inside of the V structure. A rod engaging portion of the housing 20b has a curved horn portion 78 which serves the same purpose as the bulbous portion 46 of Figure 1. The horn portion 78 as seen from Figure 10 has a curved configuration but as seen from Figure 11 has a transverse surface which continues on into a downwardly inclined surface 80. The inclined surface 80 continues on to a recess 82 which recess corresponds to the recess 50 of Figure 1. Beyond the recess 82 there is provided a bumper or rod engaging surface 84 which serves the same purpose as the surface 44 of Figure 5. The surfaces 78, 80, 82 and 84 as may be appreciated from the view shown in Figure 12 are formed by bending outwardly the two portions of the housing 58b which form the forward portion of the housing 20b. From this construction, it will be further appreciated that certain variations may be made in the configuration shown all in accordance with the teaching of the present invention.

While for the purpose of illustrating and describing the present invention a preferred embodiment has been shown in the drawings, it is to be understood that the invention is not to be limited thereby since such modifications and variations in the components therein and an arrangement there contemplated as may be commensurate to the spirit and scope of the invention set forth in the following claims.

This invention is hereby claimed as follows:

1. A lifting jack comprising a vertical toothed bar of beam cross sectional configuration having a web and a flange provided with a plurality of integrally formed teeth projecting from said flange and spaced longitudinally at uniform intervals greater than the base dimensions of said teeth transversely of the bar, said teeth having pawl engaging sides formed convex in a direction transverse to the face of said bar, a load lifting housing surrounding said bar and containing a pawl and latch mechanism to engage said teeth including a pivoted actuating member extending to the exterior of said housing, said pawl and latch mechanism comprising pawl means cooperating with said teeth, said pawl means having a transverse outer edge configuration conforming to the configurations of said sides of said teeth.

2. A lifting jack comprising a vertical bar provided with a plurality of teeth formed integrally therewith, said teeth having pawl engaging sides formed convex in a direction transverse with respect to the face of said bar, a load lifting housing surrounding said bar and containing a pawl and latch mechanism to engage said teeth, and a pivoted actuating member mounted in said housing and extending to the exterior thereof for actuating said pawl and latch mechanism, the pawls of said pawl mechanism having a transverse outer edge conforming to the configuration of said sides of said teeth.

3. A lifting jack comprising a vertical bar provided with a plurality of teeth formed integrally therewith, said teeth having pawl engaging sides formed convex in a direction transverse with respect to the face of said bar, a load lifting housing surrounding said bar and containing a pawl and latch mechanism to engage said teeth and a pivoted actuating member mounted in said housing and extending to the exterior thereof for actuating said pawl and latch mechanism, the pawls of said pawl mechanism having a transverse outer edge conforming to the configuration of the sides of said teeth, said housing including a projection extending therefrom for engaging the bumper of an automobile, said projection having a bumper engaging surface disposed at an acute angle to the vertical when said housing is in engaging position, said bumper engaging surface being adapted to receive the face of the bumper, said bumper engaging surface having a covering member thereon to protect the finish of the bumper contacting therewith, and a member extending forwardly and below said engaging surface to serve as a hook, said member having a rearwardly inclined surface which is disposed at an acute angle to the horizontal when the housing is in the bumper engaging position.

4. A lifting jack comprising an elongated vertical bar provided with a plurality of teeth formed integrally therewith and uniformly spaced longitudinally of the bar, each of said teeth having a pair of pawl engaging sides disposed transversely to the longitudinal axis of said bar and formed convex in a direction transverse to the longitudinal axis of the toothed face of said bar, a load lifting housing surrounding said bar and containing a pawl and latch mechanism to engage said teeth, and a pivoted actuating member mounted in said housing and extending to the exterior thereof and actuating said pawl and latch mechanism, the pawl of said pawl mechanism having a transverse outer edge conforming to the configuration of the pawl engaging sides of said teeth.

5. A lifting jack for a vehicle having a bumper adapted to receive a lifting force, said vehicle bumper having a horizontally extending downwardly facing wall with an outer portion and a lower edge spaced below and inwardly of said outer portion, said wall having a recess therein spaced outwardly of said lower edge, said jack comprising a lifting housing, means for moving said housing in a generally vertical direction, said lifting housing having a bumper engaging surface disposed at an acute angle to the vertical and an arm spaced below said surface adapted to underlie said bumper wall, a projection on said arm adapted to be placed within said bumper recess to provide for positive engagement of said bumper and said arm, said projection being at a lesser horizontal distance from said housing than said one edge portion is from said outer portion of said bumper nearest said housing so that abutment of said housing with said outer portion prevents said projection from extending inwardly to said lower edge, the inner section between said bumper engaging surface and said arm being recessed away from said projection whereby to receive the lower edge of an upright conventional bumper in said recessed portion with the face of the bumper against said bumper engaging surface.

6. A vehicle jack comprising an upstanding post, a housing mounted on said post, and means for moving said housing upwardly and downwardly with respect to said post, said housing including a bumper engaging surface disposed at an acute angle to the vertical and sloping downwardly and away from said post, said bumper engaging surface being adapted to receive the face of the bumper, an arm attached to said housing at a point positioned below said bumper engaging surface and extending upwardly away from said post, a projection formed on said arm adapted to project into a recess in a bumper having a horizontally extending downwardly facing wall with an outer portion and a lower edge spaced below and inwardly of said outer portion, the recess in said bumper being in said wall and spaced outwardly of said lower edge of said bumper, said housing having a concave recess extending toward said post and positioned below said bumper engaging surface and the upper end of said projection, said recess being adapted to receive the lower edge of an upright bumper, the forward face of the upright bumper being positioned against said bumper engaging surface.

ALPHONSE W. HUNZ.

REFERENCES CITED

The following references are of record in the file of this patent:

UNITED STATES PATENTS

| Number | Name | Date |
|---|---|---|
| 1,104,328 | Sutton | July 21, 1914 |
| 1,389,355 | Herold | Aug. 30, 1921 |
| 1,526,152 | Kinney | Feb. 10, 1925 |
| 2,259,789 | Akins | Oct. 21, 1941 |
| 2,260,993 | Johnston | Oct. 28, 1941 |
| 2,266,760 | Hunz | Dec. 23, 1941 |
| 2,383,204 | Le Veque | Aug. 21, 1945 |
| 2,397,965 | Hinz | Apr. 9, 1946 |